(12) United States Patent
Pan et al.

(10) Patent No.: US 8,058,358 B2
(45) Date of Patent: Nov. 15, 2011

(54) METHOD AND FORMULA FOR FORMING HYPER-BRANCHED POLYMER

(75) Inventors: Jing-Pin Pan, Hsinchu Hsien (TW); Tsung-Hsiung Wang, Dali (TW)

(73) Assignee: Industrial Technology Research Institute (TW)

( * ) Notice: Subject to any disclaimer, the term of this patent is extended or adjusted under 35 U.S.C. 154(b) by 312 days.

(21) Appl. No.: 12/334,334

(22) Filed: Dec. 12, 2008

(65) Prior Publication Data

US 2010/0022716 A1    Jan. 28, 2010

(30) Foreign Application Priority Data

Jul. 23, 2008 (TW) ............................... 97127913 A

(51) Int. Cl.
    *C08G 73/10* (2006.01)
(52) U.S. Cl. ........ 525/375; 528/322; 528/314; 528/228; 528/170; 528/26
(58) Field of Classification Search .................. 525/375; 528/322, 310, 314, 228, 170, 26
    See application file for complete search history.

(56) References Cited

U.S. PATENT DOCUMENTS

| 2006/0122361 A1* | 6/2006 | Olson et al. ................... 528/367 |
| 2008/0146706 A1* | 6/2008 | Tseng et al. ................... 524/101 |
| 2008/0157021 A1* | 7/2008 | Wang et al. ................... 252/62.2 |

FOREIGN PATENT DOCUMENTS

CN    101210073    7/2008

OTHER PUBLICATIONS

Pan et al "Effect of Barbituric Acid on the Self-Polymerization Reaction of Bismaleimide", Journal of Applied Polymer Science, vol. 45, 103-109 (1992).*
Office Action from Chinese Application No. 200810146910.5.

* cited by examiner

*Primary Examiner* — James J Seidleck
*Assistant Examiner* — Gregory Listvoyb
(74) *Attorney, Agent, or Firm* — Lowe Hauptman Ham & Berner, LLP

(57) ABSTRACT

The invention provides hyper-branched polymer manufactured by adding a bismaleimide and a barbituric acid into a Brönsted base solution and reacting the mixture at 20 to 100° C. The formation may further include maleimide monomer and/or multi-maleimide monomer to modify the hyper-branched polymer properties. In addition, the barbituric acid is added to the reaction in a batch not initially charged with other reactants in a one-pot.

11 Claims, 10 Drawing Sheets

METHOD AND FORMULA FOR FORMING HYPER-BRANCHED POLYMER

CROSS REFERENCE TO RELATED APPLICATIONS

This Application claims priority of Taiwan Patent Application No. 97127913, filed on Jul. 23, 2008, the entirety of which is incorporated by reference herein.

BACKGROUND OF THE INVENTION

1. Field of the Invention

The present invention relates to a hyper-branched polymer, and in particular relates to the formula thereof and a method for manufacturing the same.

2. Description of the Related Art

Dendritic polymers are belonging to a special class of macromolecules. Generally, dendritic polymer is a polymer with a hyper-branched or arborized structure, and its solubility is higher than a linear polymer with a similar structure due to its hyper-branched structure having characteristics such as loose molecular packing, larger free volume, and less molecular chain tangling. According to branch degree, the polymer can be categorized to two types as below.

(1) Dendrimer, synthesized by divergent or convergent approaches. In the divergent approach, the structural size is divergent from the core to outer-layer by several generations. In the convergent approach, the branch is firstly synthesized and then symmetrically grafted to a core. The dendrimer structure us symmetrical and almost spherical, and the theoretical degree of the branch thereof is 1. Because of its special structure, the dendrimer has individual physical and chemical properties such as excellent solubility, low viscosity, amorphism, and a great amount of terminal groups. However, the synthesis of dendrimer is repeated by adding protective groups, deprotection, and purification, such that synthesis is difficult and yields are low. Therefore, the cost of dendrimer is expensive and not feasible for mass production.

(2) Hyper-branched polymer: synthesized from $AB_x$ monomer (x is an integral greater than or equal to 2) by one step polymerization, such that the hyper-branched polymer structure is irregular compared to dendrimer. The degree of the branch of the hyper-branched polymer is about 0.5. Formula 1 shows the synthesis of hyper-branched polymer from $AB_2$ monomer, wherein A and B are reactive functional groups, and ab is the condensation segment of A and B. The resulting hyper-branched polymer structure has a great amount of terminal groups to further modify materials for improving material physical properties. In addition, the hyper-branched polymer also owns some individual properties of the dendrimer, however, it is simpler in synthesis and better in molecular structural control. Hyper-branched polymers have unique properties such as completely amorphous, highly soluble in common organic solvent and processible because of the highly branched nature. The hyper-branched polymer has excellent solubility and a simpler manufacturing process, thereby attracting industry and academia attention for increased research and development.

(Formula 1)

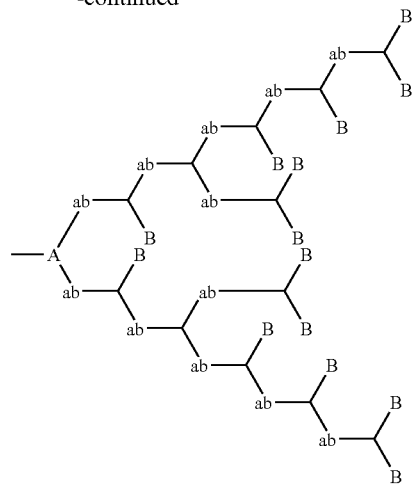

In Functional Material (Japan), vol. 26, No. 8, page 44-52 (2006), Emeritus Prof. Tsueyuki Sato of Tokushima University disclosed "Nanosize hyper-branched polymer". This paper alludes that the hyper-branched polymer is generally synthesized from $AB_2$ monomer by one-pot reaction, and tagged as an initiator-fragment incorporation radical polymerization (IFIRP). The combination of the monomer and initiator in the IFIRP, called inimer, is limited in types and application manners. The synthesis utilized inimer has low yields and low controbility of molecular structure and molecular weight, such that its applications are restricted. The chain transfer agent and recombination inhibitor can be applied in the initiating step for improving the yield and controbility of the hyper-branched polymer synthesis, however, it will increase steps and complexity of the synthesis.

BRIEF SUMMARY OF THE INVENTION

The invention provides a method for forming a hyper-branched polymer, comprising adding a bismaleimide and a barbituric acid into a Brönsted base solution and reacting the mixture at 20 to 100° C. to form a hyper-branched polymer.

The invention also provides a hyper-branched polymer formula, comprising a bismaleimide; a barbituric acid; and a Brönsted base solution.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
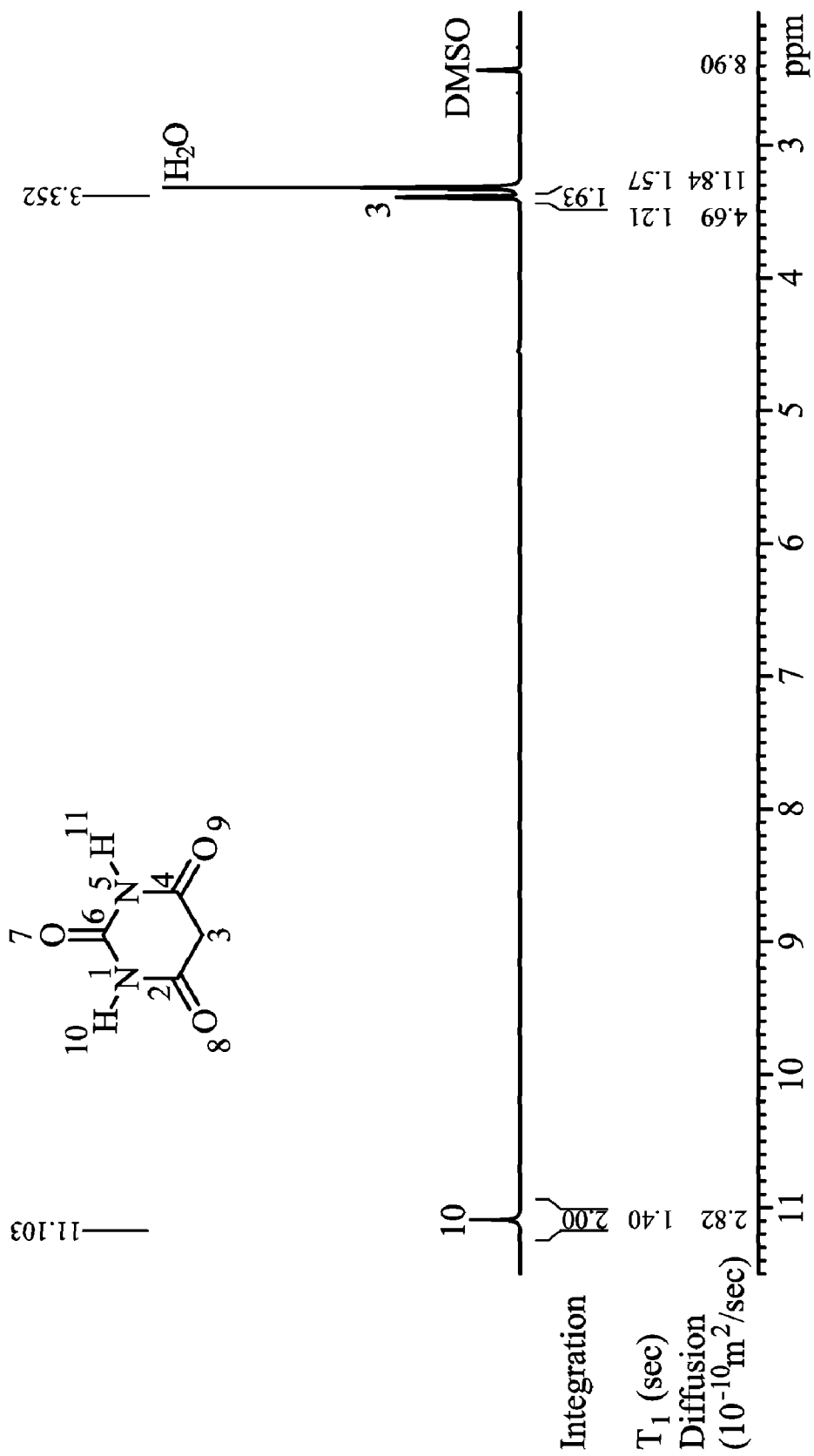
FIG. 1 is the $^1$H NMR spectrum of BTA.

The following description is of the best-contemplated mode of carrying out the invention. This description is made for the purpose of illustrating the general principles of the invention and should not be taken in a limiting sense. The scope of the invention is best determined by reference to the appended claims.

The invention discloses a novel hyper-branched polymer and method for manufacturing the same. A bismaleimide and a barbituric acid are added into a Brönsted base solution and reacted at 20 to 100° C., or room temperature, to form a hyper-branched polymer. Note that during polymerization, the barbituric acid serves as a monomer, initiator, propagator, inhibitor, and terminator according to different reaction conditions such as reactant concentration and ratio, hydrogen bond effect, solvent effect, temperature and duration gradient, and reaction atmosphere. Due to the highly flexible structure and controlled polymerization engineering of the hyper-branched polymer, prospective applications are increased.

The barbituric acid formula is shown as in Formula 2:

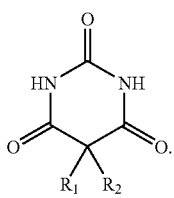

(Formula 2)

In Formula 2, $R_1$ and $R_2$ are independently selected from —H, —$CH_3$, —($C_6H_5$), —$CH(CH_3)_2$, —$CH_2CH(CH_3)_2$, —$CH_2CH_2CH(CH_3)_2$, or

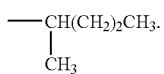

The barbituric acid has a specific structure, the hydrogen in $R_1$ and $R_2$ positions can be substituted by different functional groups to form enantiomers. If the structure superimposes its mirror image, it becomes a so-called achiral molecule. If the structure does not superimpose its mirror image, it becomes a so-called chiral molecule having a chiral center. The barbituric acid has several types of hydrogen, nitrogen, and oxygen, thereby easily forming inter-molecular hydrogen bonding and clustering. The barbituric acid can be a terminator and radical scavenger. The barbituric acid terminates the reaction not by providing radicals but capturing the radicals to decrease activity. As such, aggregation from over polymerization is prevented, and the molecular structure and molecular weight of the hyper-branched polymer are stabilized. In one embodiment, the bismaleimide and the barbituric acid have a molar ratio of 40:1 to 0.4:1.

Note that the solvent of the invention must include Brönsted base such as N-methyl pyrrolidone (NMP), dimethylformamide (DMF), dimethylacetamide (DMAC), pyrrolidone, N-dodecylpyrrolidone, or combinations thereof. Other Brönsted neutral solvent, e.g. γ-Butyrolactone (GBL) may be added to the described Brönsted base to tune the acid-base value of the solvent system. Compared to the conventional polymerization temperature (>100° C.) of bismaleimide and barbituric acid, the polymerization temperature of the invention is only 20 to 100° C. and may be without heating (room temperature). As proven by experiments, the critical point of the low temperature polymerization in the invention is based on the Brönsted base solvent.

In one embodiment, the hyper-branched polymer properties can be modified by introducing maleimide and/or multi-maleimide. The maleimide includes N-phenylmaleimide, N-cyclohexylmaleimide, or other suitable maleimide as shown in Formula 3. The multi-maleimide comprises tris(4-phenymaleimide) amine, polyphenylmethane maleimide, or other suitable multi-maleimide as shown in Formulae 4-6, respectively. In one embodiment, the bismaleimide and (the multi-maleimide and/or the maleimide) have a molar ratio of 99:1 to 1:1. Following are Formulae 3, 4, 5 and 6 of the invention:

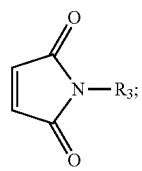

(Formula 3)

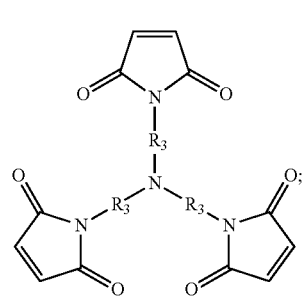

(Formula 4)

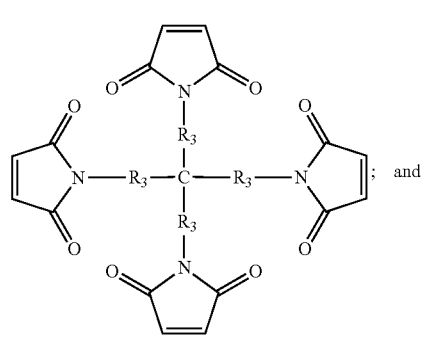

(Formula 5); and

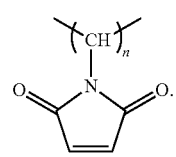

(Formula 6)

In the Formulae, $R_3$ is selected from phenyl, $C_{1-8}$ alkyl, or $C_{5-8}$ cycloalkyl groups. In Formula 6, n is an integral from 5 to 1000.

The described bismaleimide is shown as in Formulae 7 or 8:

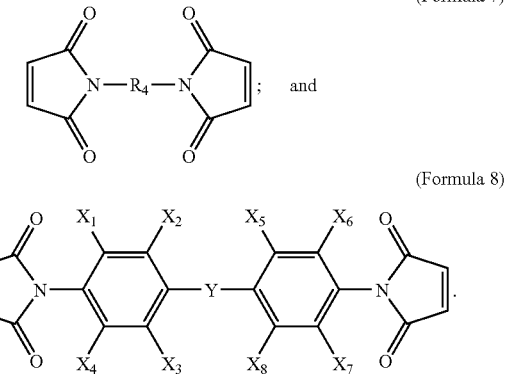

(Formula 7)

(Formula 8)

In Formula 7, $R_4$ is selected from —R—, —R—$NH_2$—R—, —C(O)—, —R—C(O)—R—, —R—C(O)—, —O—, —O—O—, —S—, —S—S—, —S(O)—, —R—S(O)—R—, —$SO_2$—, ($C_6H_4$)—, —R—($C_6H_4$)—R—, —R—($C_6H_4$)—O—, ($C_6H_4$)—($C_6H_4$)—, —R—($C_6H_4$)—($C_6H_4$)—R—, or —R—($C_6H_4$)—($C_6H_4$)—O—; R is $C_{1-8}$ alkyl, ($C_6H_4$) is phenyl, and ($C_6H_4$)—($C_6H_4$) is biphenyl. In Formula 8, Y is selected from —R—, —C(O)—, —O—, —O—O—, —S—, —S—S—, —S(O)—, or —$SO_2$—; each $X_1, X_2, X_3, X_4, X_5, X_6, X_7$, and $X_8$ is independently selected from halogen, hydrogen, $C_{1-8}$ alkyl, $C_{1-8}$ cycloalkyl, or $C_{1-8}$ silylalkyl.

In one embodiment, the bismaleimide comprises N,N'-bismaleimide-4,4'-diphenylmethane, 1,1'-(methylenedi-4,1-phenylene)bismaleimide, N,N'-(1,1'-biphenyl-4,4'-diyl)bismaleimide, N,N'-(4-methyl-1,3-phenylene)bismaleimide, 1,1'-(3,3'dimethyl-1,1'-biphenyl-4,4'-diyl)bismaleimide, N,N'-ethylenedimaleimide, N,N'-(1,2-phenylene)dimaleimide, N,N'-(1,3-phenylene)dimaleimide, N,N'-thiodimaleimid, N,N'-dithiodimaleimid, N,N'-ketonedimaleimid, N,N'-methylene-bis-maleinimid, bis-maleinimidomethyl-ether, 1,2-bis-(maleimido)-1,2-ethandiol, N,N'-4,4'-diphenylether-bis-maleimid, or 4,4'-bis(maleimido)-diphenylsulfone.

Note that the barbituric acid of the invention is added to the reaction in a batch, and not initially charged with other reactants in a one-pot. The barbituric acid in a batch may adjust concentration ratio, reaction temperature, reaction duration, atmosphere, and other controllable factors to modify the hyper-branched polymer properties such as degree of the branch, polymerization degree, and structure. The highly pure functional bismaleimide polymer of the invention has a hyper-branched structure and multi double bond reactive functional groups, thereby enhancing its solubility and trapping ability in solvent, improving its compatibility and reactivity with resins, and having excellent processing capabilities. As such, no resin modification is needed to overcome problems due to solubility and compatibility, and the material brittleness can be reduced. The hyper-branched polymer may further react with epoxy resins, polyimide, acrylate, and other resins to form molecular composites with higher thermal stability, softness, solvent-preserved property, or other better physical, chemical, electrical, and mechanical properties. The liquid, solid, solution, gel, or liquid crystal types of the hyper-branched polymer can be utilized in various fields such as electronic packaging, display, solar cell, detector, photoelectric material, electrolyte additive, liquid/gel/solid polymer electrolyte, separator film, ion/proton exchange membrane, electrode additive, catalyst, functional composite, coating, or bio-material fields.

EXAMPLES AND COMPARATIVE EXAMPLES

The description of the materials used in the Examples or Comparative Examples are listed as below.

The barbituric acid, with $^1$H NMR and formula shown in FIG. 1, was used and is commercially available from Alfa Aesar. The chemical shift thereof was: $^1$H NMR (500 MHz, $d^6$-DMSO): δ 3.352 (m, 2H), 11.103 (m, 2H).

Figure 2:
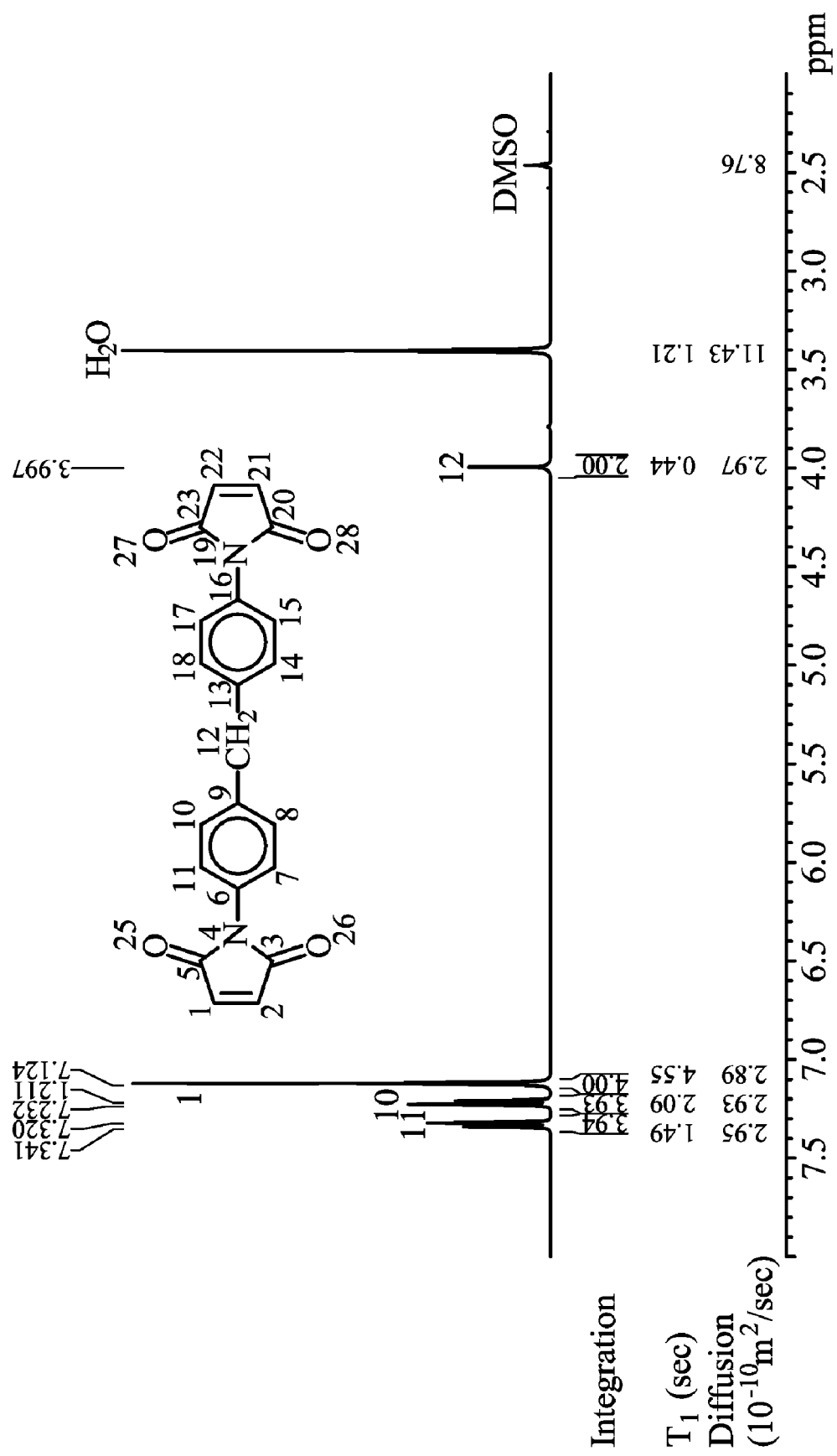
FIG. 2 is the $^1$H NMR spectrum of BMI.

The bismaleimide, with $^1$H NMR and formula shown in FIG. 2, was used and is commercially available from Homide. The chemical shift thereof was: $^1$H NMR (500 MHz, $d^6$-DMSO): δ 3.997 (m, 2H), 7.124 (s, 4H), 7.211-7.232 (d, 4H), 7.7320-7.341 (d, 4H).

Solvents such as γ-Butyrolactone (GBL), propylene carbonate (PC), N-methyl pyrrolidone (NMP), dimethylformamide (DMF), dimethylacetamide (DMAC), pyrrolidone, and N-dodecylpyrrolidone were used and are commercially available from Tokyo Chemical Industry Co., LTD.

N-phenyl-maleimide (PMI) was used and is commercially available from Tokyo Chemical Industry Co., LTD.

Bisphenol A diphenyl ether bismaleimide and polyphenylmethane maleimide were used and are commercially available from Daiwakasei Industry Co., LTD.

All reagents and solvents were dried before reaction to prevent side reaction caused from water. The bismaleimide was dried by a vacuum at 70° C. in a vacuum oven, thereby desorbing the remaining water. The barbituric acid was labile and sensitive to temperature, such that the barbituric acid was only dried in a vacuum at room temperature. In addition, the solvents were added a molecular sieve or dehydrator to remove the water contained thereof.

Comparative Example 1

BMI-GBL-20 wt %-90° C.-6H

BMI-GBL-20 wt %-90° C.-6H means that only BMI in the GBL solvent with the solid content of 20 wt % was reacted at 90° C. for 6 hours. The reaction process and conditions are listed as below:

20 g 4,4'-Bismaleimido di-phenylmethane was charged in a 250 mL three-neck round bottom bottle, added 80 g GBL solvent, heated to 90° C. and adequately stirred to make the 4,4'-Bismaleimido di-phenylmethane totally dissolved in the GBL solvent. After stirred for 6 hours, the resulting mixture was left at room temperature. Referring to the GPC diagram of the resulting mixture, no reaction occurred.

Comparative Example 2

BMI-NMP-20 wt %-40° C.-6H

BMI-NMP-20 wt %-40° C.-6H means that only BMI in the NMP solvent with the solid content of 20 wt % was reacted at 40° C. for 6 hours. The reaction process and conditions are listed as below:

20 g 4,4'-Bismaleimido di-phenylmethane was charged in a 250 mL three-neck round bottom bottle, added 80 g NMP solvent, heated to 40° C. and adequately stirred to make the 4,4'-Bismaleimido di-phenylmethane totally dissolved in the NMP solvent. After stirred for 6 hours, the resulting mixture was left at room temperature. Referring to the GPC diagram of the resulting mixture, no reaction occurred.

Comparative Example 3

BMI-NMP-20 wt %-70° C.-6H

BMI-NMP-20 wt %-70° C.-6H means that only BMI in the NMP solvent with the solid content of 20 wt % was reacted at 70° C. for 6 hours. The reaction process and conditions are listed as below:
20 g 4,4'-Bismaleimido di-phenylmethane was charged in a 250 mL three-neck round bottom bottle, added 80 g NMP solvent, heated to 70° C. and adequately stirred to make the 4,4'-Bismaleimido di-phenylmethane totally dissolved in the NMP solvent. After stirred for 6 hours, the resulting mixture was left at room temperature. Referring to the GPC diagram of the resulting mixture, no reaction occurred.

Comparative Example 4

BTA-GBL-1 wt %-40° C.-6H

BTA-GBL-1 wt %-40° C.-6H means that only BTA in the GBL solvent with the solid content of 1 wt % was reacted at 40° C. for 6 hours. The reaction process and conditions are listed as below:
0.5 g barbituric acid was charged in a 250 mL three-neck round bottom bottle, added 50 g GBL solvent, heated to 40° C., and adequately stirred for 6 hours. The resulting mixture was left at room temperature. The BTA was not totally dissolved in GBL, and white powder of BTA was precipitated in bottle bottom.

Comparative Example 5

BTA-NMP-1 wt %-70° C.-6H

BTA-NMP-1 wt %-70° C.-6H means that only BTA in the NMP solvent with the solid content of 1 wt % was reacted at 70° C. for 6 hours. The reaction process and conditions are listed as below:
0.5 g barbituric acid was charged in a 250 mL three-neck round bottom bottle, added 50 g NMP solvent, heated to 70° C., and adequately stirred for 6 hours. The resulting mixture was left at room temperature. The BTA was totally dissolved to form a yellow orange solution.

Comparative Example 6

BTA-DMF-1 wt %-40° C.-6H

BTA-DMF-1 wt %-40° C.-6H means that only BTA in the DMF solvent with the solid content of 1 wt % was reacted at 40° C. for 6 hours. The reaction process and conditions are listed as below:
0.5 g barbituric acid was charged in a 250 mL three-neck round bottom bottle, added 50 g DMF solvent, heated to 40° C., and adequately stirred for 6 hours. The resulting mixture was left at room temperature. The BTA was totally dissolved to form a yellow orange solution.

Example 1

STOBA(1:1)-GBL-20 wt %-90° C.-6H

"STOBA" is an abbreviation of a self-terminated oligomer with hyper-branched architecture. STOBA(1:1)-GBL-20 wt %- 90° C.-6H means that BMI and BTA in the GBL solvent with the solid content of 20 wt % were reacted at 90° C. for 6 hours, wherein the BMI and BTA had a molar ratio of 1:1. The reaction process and conditions are listed as below:
(1) 18 g of 4,4'-Bismaleimido di-phenylmethane was charged in a 250 mL three-neck round bottom bottle, added 60 g GBL solvent, heated to 90° C. and adequately stirred to make the 4,4'-Bismaleimido di-phenylmethane totally dissolved in the GBL solvent.
(2) 7 g of BTA powder was added to 40 g GBL solvent and adequately stirred to make the BTA evenly dispersed in the GBL solvent.
(3) The BTA-GBL emulsion was divided into 8 equal parts for adding to the BMI-GBL solution in a batch for every 15 minutes, and the mixture was adequately stirred to process thermal polymerization of the BMI double bonds.
(4) When 8 parts of the BTA-GBL emulsion were totally added to the BMI-GBL solution, the reaction was processed for an additional 4 hours.
(5) The reaction was completed and cooled to room temperature, and the result was a clear brown yellow liquid, STOBA(1:1)-GBL-20 wt %-90° C.-6H.

Example 2

STOBA(1:1)-NMP-20 wt %-70° C.-6H

STOBA(1:1)-NMP-20 wt %-70° C.-6H means that BMI and BTA in the NMP solvent with the solid content of 20 wt % were reacted at 70° C. for 6 hours, wherein the BMI and BTA had a molar ratio of 1:1. The reaction process and conditions are listed as below:
(1) 18 g of 4,4'-Bismaleimido di-phenylmethane was charged in a 250 mL three-neck round bottom bottle, added 60 g NMP solvent, heated to 70° C. and adequately stirred to make the 4,4'-Bismaleimido di-phenylmethane totally dissolved in the NMP solvent.
(2) 7 g of BTA powder was added to 40 g of the NMP solvent and adequately stirred to make the BTA evenly dispersed in the NMP solvent.
(3) The BTA-NMP emulsion was divided into 8 equal parts for adding to the BMI-NMP solution in a batch for every 15 minutes, and the mixture was adequately stirred to process thermal polymerization of the BMI double bonds.
(4) When 8 parts of the BTA-NMP emulsion were totally added to the BMI-NMP solution, the reaction was processed for an additional 4 hours.
(5) The reaction was completed and cooled to room temperature, and the result was a clear brown liquid, STOBA(1:1)-NMP-20 wt %-70° C.-6H.

Example 3

STOBA(1:1)-DMF-20 wt %-40° C.-20H

STOBA(1:1)-DMF-20 wt %-40° C.-20H means that BMI and BTA in the DMF solvent with the solid content of 20 wt % were reacted at 40° C. for 20 hours, wherein the BMI and BTA had a molar ratio of 1:1. The reaction process and conditions are listed as below:
(1) 18 g of 4,4'-Bismaleimido di-phenylmethane was charged in a 250 mL three-neck round bottom bottle, added 60 g DMF solvent, heated to 40° C. and adequately stirred to make the 4,4'-Bismaleimido di-phenylmethane totally dissolved in the DMF solvent.

(2) 7 g of BTA powder was added to 40 g of the DMF solvent and adequately stirred to make the BTA evenly dispersed in the DMF solvent.

(3) The BTA-DMF emulsion was divided into 8 equal parts for adding to the BMI-DMF solution in a batch for every 15 minutes, and the mixture was adequately stirred to process thermal polymerization of the BMI double bonds.

(4) When 8 parts of the BTA-DMF emulsion were totally added to the BMI-DMF solution, the reaction was processed for an additional 18 hours.

(5) The reaction was completed and cooled to room temperature, and the result was a clear brown yellow liquid, STOBA(1:1)-DMF-20 wt %-40° C.-20H.

Example 4

STOBA(1:1)-NMP/GBL-20 wt %-70° C.-6H

STOBA(1:1)-NMP/GBL-20 wt %-70° C.-6H means that BMI and BTA in the NMP/GBL co-solvent (weight ratio of 1:1) with the solid content of 20 wt % were reacted at 70° C. for 6 hours, wherein the BMI and BTA had a molar ratio of 1:1. The reaction process and conditions are listed as below:

(1) 18 g of 4,4'-Bismaleimido di-phenylmethane was charged in a 250 mL three-neck round bottom bottle, added 60 g of the NMP/GBL co-solvent, heated to 70° C. and adequately stirred to make the 4,4'-Bismaleimido di-phenylmethane totally dissolved in the NMP/GBL co-solvent.

(2) 7 g of BTA powder was added to 40 g of the NMP/GBL co-solvent and adequately stirred to make the BTA evenly dispersed in the NMP/GBL co-solvent.

(3) The BTA-NMP/GBL emulsion was divided into 8 equal parts for adding to the BMI-NMP/GBL solution in a batch for every 15 minutes, and the mixture was adequately stirred to process thermal polymerization of the BMI double bonds.

(4) When 8 parts of the BTA-NMP/GBL emulsion were totally added to the BMI-NMP/GBL solution, the reaction was processed for an additional 4 hours.

(5) The reaction was completed and cooled to room temperature, and the result was a clear brown liquid, STOBA(1:1)-NMP/GBL-20 wt %-70° C.-6H.

Example 5

STOBA(1:1)-DMF/GBL-20 wt %-85° C.-6H

STOBA(1:1)-DMF/GBL-20 wt %-85° C.-6H means that BMI and BTA in DMF/GBL co-solvent (weight ratio of 1:1) with the solid content of 20 wt % were reacted at 85° C. for 6 hours, wherein the BMI and BTA had a molar ratio of 1:1. The reaction process and conditions are listed as below:

(1) 18 g of 4,4'-Bismaleimido di-phenylmethane was charged in a 250 mL three-neck round bottom bottle, added 60 g of the DMF/GBL co-solvent, heated to 85° C. and adequately stirred to make the 4,4'-Bismaleimido di-phenylmethane totally dissolved in the DMF/GBL co-solvent.

(2) 7 g of BTA powder was added to 40 g of the DMF/GBL co-solvent and adequately stirred to make the BTA evenly dispersed in the DMF/GBL co-solvent.

(3) The BTA-DMF/GBL emulsion was divided into 8 equal parts for adding to the BMI-DMF/GBL solution in a batch for every 15 minutes, and the mixture was adequately stirred to process thermal polymerization of the BMI double bonds.

(4) When 8 parts of the BTA-DMF/GBL emulsion were totally added to the BMI-DMF/GBL solution, the reaction was processed for an additional 4 hours.

(5) The reaction was completed and cooled to room temperature, and the result was a clear brown liquid, STOBA(1:1)-DMF/GBL-20 wt %-85° C.-6H.

Example 6

STOBA(1:1)-DMF-10 wt %-90° C.-6H

STOBA(1:1)-DMF-10 wt %-90° C.-6H means that BMI and BTA in the DMF solvent with the solid content of 10 wt % were reacted at 90° C. for 6 hours, wherein the BMI and BTA had a molar ratio of 1:1. The reaction process and conditions are listed as below:

(1) 9 g of 4,4'-Bismaleimido di-phenylmethane was charged in a 250 mL three-neck round bottom bottle, added 60 g of the DMF solvent, heated to 90° C. and adequately stirred to make the 4,4'-Bismaleimido di-phenylmethane totally dissolved in the DMF solvent.

(2) 3.5 g of BTA powder was added to 40 g of the DMF solvent and adequately stirred to make the BTA evenly dispersed in the DMF solvent.

(3) The BTA-DMF emulsion was divided into 8 equal parts for adding to the BMI-DMF solution in a batch for every 15 minutes, and the mixture was adequately stirred to process thermal polymerization of the BMI double bonds.

(4) When 8 parts of the BTA-DMF emulsion were totally added to the BMI-DMF solution, the reaction was processed for an additional 4 hours.

Figure 8:
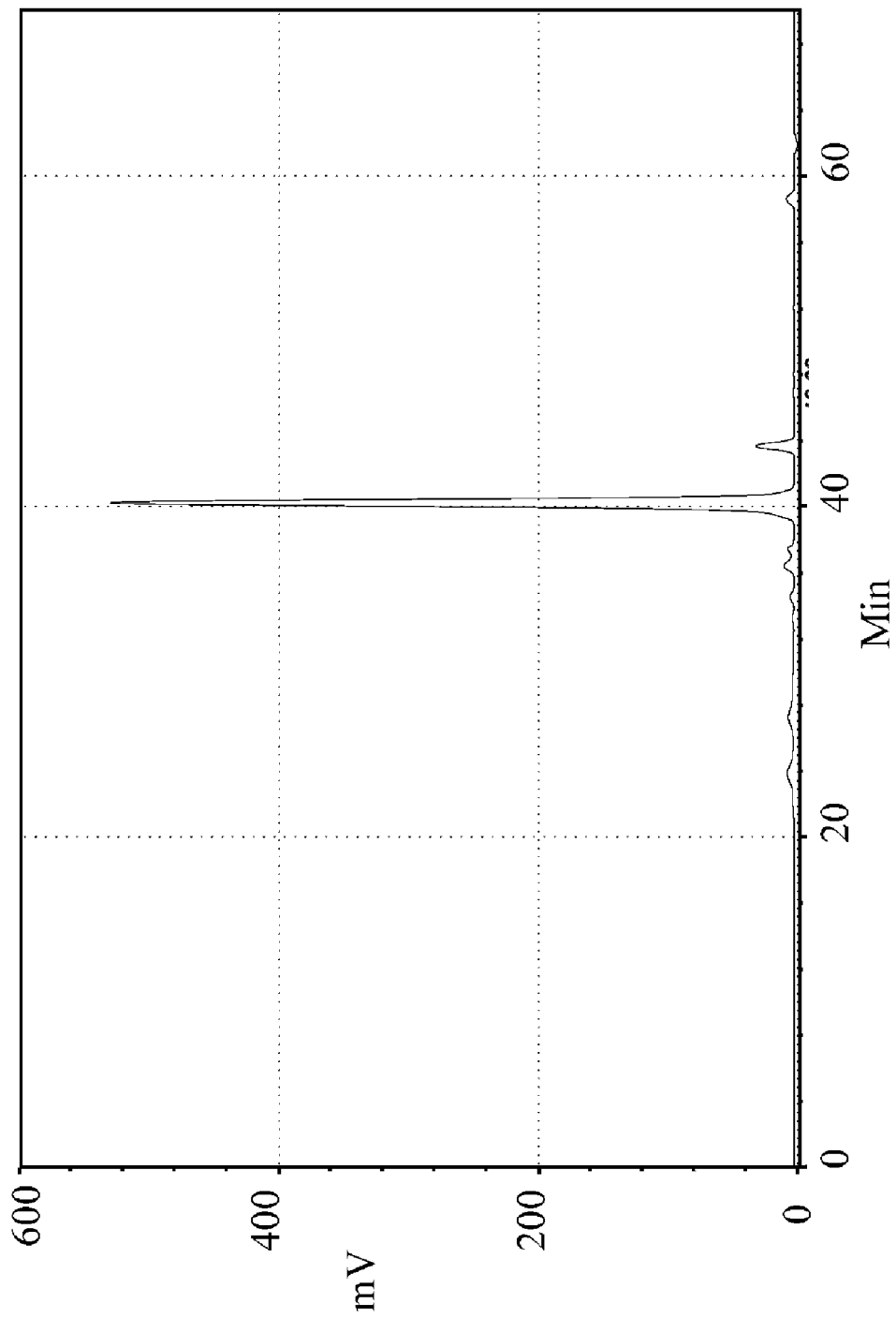
FIG. 8 is the GPC diagram of BMI in the DMF solution.
Figure 9:
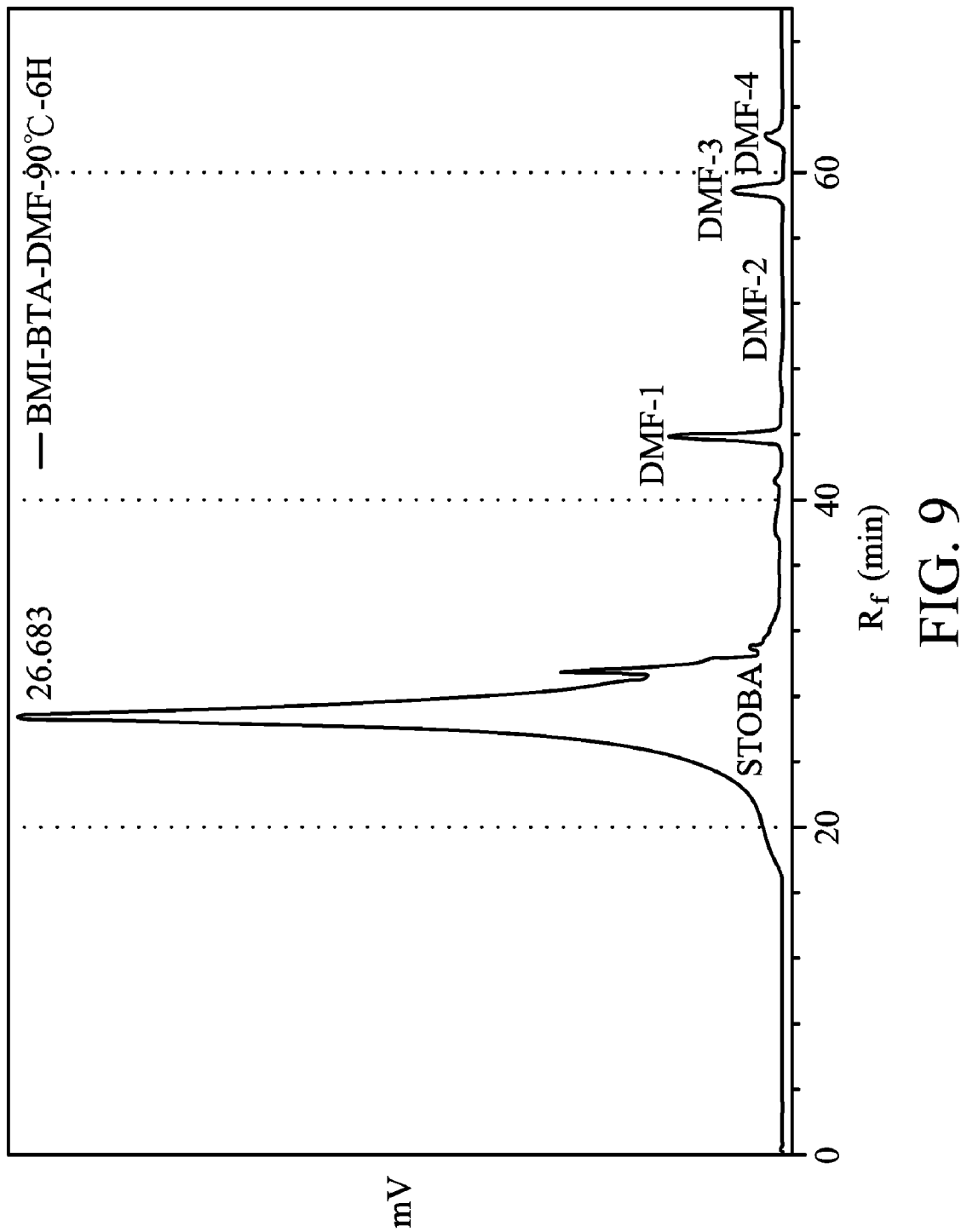
FIG. 9 is the GPC diagram of Example 6 in the invention.

(5) The reaction was completed and cooled to room temperature, and the result was a clear brown yellow liquid, STOBA(1:1)-DMF-10 wt %-90° C.-6H. Compared to the gel permeation chromatography (GPC) diagram of the BMI-DMF solution (FIG. 8) and the STOBA product of Example 6 (FIG. 9), the Rf value of the STOBA product in Example 6 is 26.6 minutes without any BMI of BTA signals. As such, the BMI and the BTA were totally reacted. In addition, the STOBA product of Example 6 is a single peak in FIG. 9, which means that the STOBA product purity is high.

Example 7

STOBA(2:1)-NMP/GBL-20 wt %-70° C.-6H

STOBA(2:1)-NMP/GBL-20 wt %-70° C.-6H means that BMI and BTA in the NMP/GBL co-solvent (weight ratio of 1:1) with the solid content of 20 wt % were reacted at 70° C. for 6 hours, wherein the BMI and BTA had a molar ratio of 2:1. The reaction process and conditions are listed as below:

(1) 21 g of 4,4'-Bismaleimido di-phenylmethane was charged in a 250 mL three-neck round bottom bottle, added 60 g of the NMP/GBL co-solvent, heated to 70° C. and adequately stirred to make the 4,4'-Bismaleimido di-phenylmethane totally dissolved in the NMP/GBL co-solvent.

(2) 4 g of BTA powder was added to 40 g of the NMP/GBL co-solvent and adequately stirred to make the BTA evenly dispersed in the NMP/GBL co-solvent.

(3) The BTA-NMP/GBL emulsion was divided into 8 equal parts for adding to the BMI-NMP/GBL solution in a batch for every 15 minutes, and the mixture was adequately stirred to process thermal polymerization of the BMI double bonds.

(4) When 8 parts of the BTA-NMP/GBL emulsion were totally added to the BMI-NMP/GBL solution, the reaction was processed for an additional 4 hours.

(5) The reaction was completed and cooled to room temperature, and the result was a clear brown yellow liquid, STOBA(2:1)-NMP/GBL-20 wt %-70° C.-6H.

Figure 10:
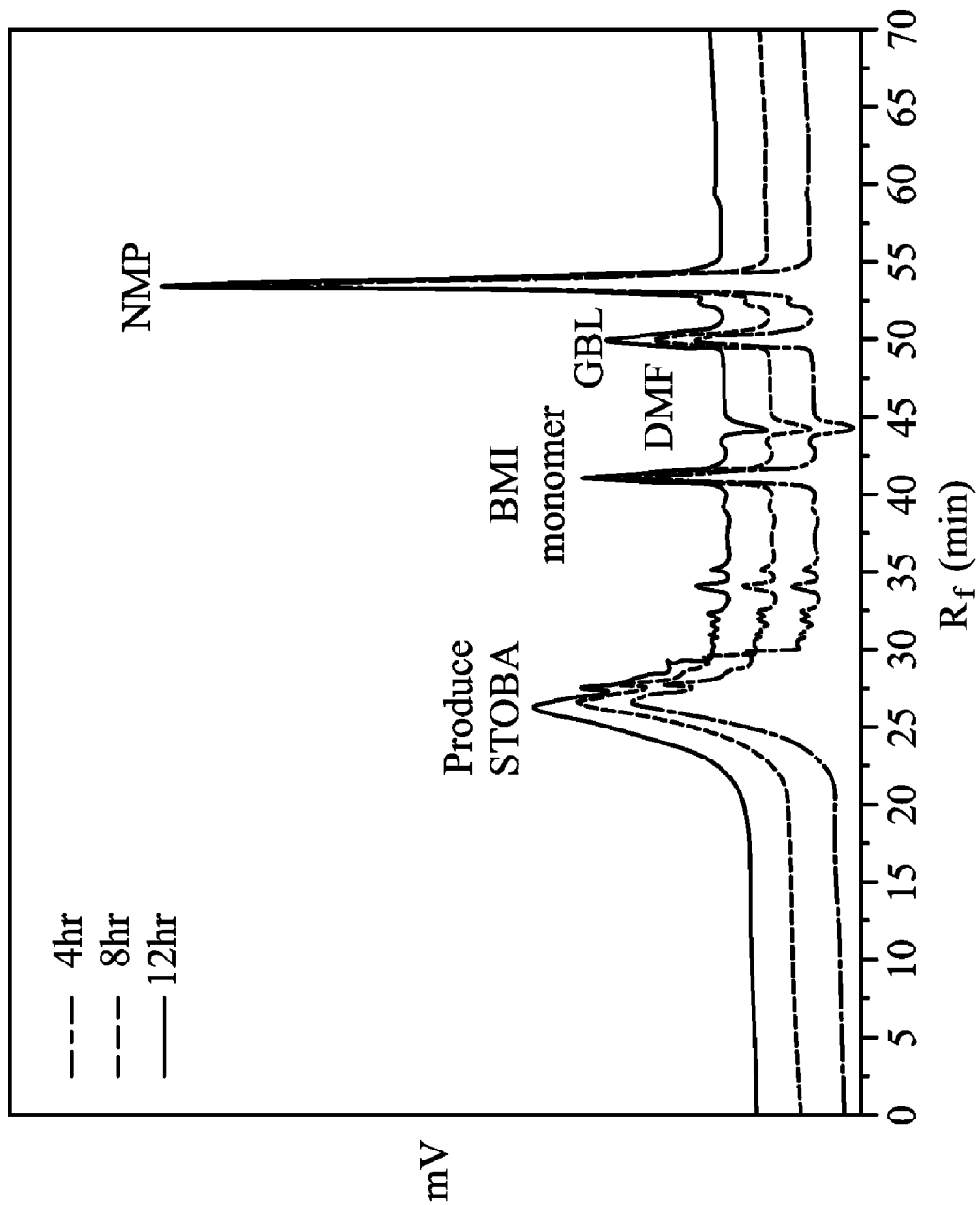
FIG. 10 is the GPC diagram of Example 7 in the invention.

In Example 7, the reaction was not only processed for an additional 4 hours, but also 8 hours and 12 hours. The products from different reaction durations were measured by GPC as shown in FIG. 10, and Rf values of the products are all about 26.6 minutes.

Example 8

PMI/BTA(1:1)-NMP-20 wt %-70° C.-6H

PMI/BTA(1:1)-NMP-20 wt %-70° C.-6H means that PMI and BTA in the NMP solvent with the solid content of 20 wt % were reacted at 70° C. for 6 hours, wherein the PMI and BTA had a molar ratio of 1:1. The reaction process and conditions are listed as below:

(1) 18 g of N-phenyl-maleimide (PMI) was charged in a 250 mL three-neck round bottom bottle, added 60 g of the NMP solvent, heated to 70° C. and adequately stirred to make the PMI totally dissolved in the NMP solvent.

(2) 7 g of BTA powder was added to 40 g of the NMP solvent and adequately stirred to make the BTA evenly dispersed in the NMP solvent.

(3) The BTA-NMP emulsion was divided into 8 equal parts for adding to the PMI-NMP solution in a batch for every 15 minutes, and the mixture was adequately stirred to process thermal polymerization of the PMI double bonds.

(4) When 8 parts of the BTA-NMP emulsion were totally added to the PMI-NMP solution, the reaction was processed for an additional 4 hours.

(5) The reaction was completed and cooled to room temperature, and the result was a clear yellow liquid, PMI/BTA(1:1)-NMP-20 wt %-70° C.-6H.

Example 9

PPMI/BTA(1:1)-NMP-20 wt %-70° C.-6H

PPMI/BTA(1:1)-NMP-20 wt %-70° C.-6H means that PPMI and BTA in the NMP solvent with the solid content of 20 wt % were reacted at 70° C. for 6 hours, wherein the PPMI and BTA had a molar ratio of 1:1. The reaction process and conditions are listed as below:

(1) 18 g of polyphenylmethane maleimide (PPMI) was charged in a 250 mL three-neck round bottom bottle, added 60 g NMP solvent, heated to 70° C. and adequately stirred to make the PPMI totally dissolved in the NMP solvent.

(2) 7 g of BTA powder was added to 40 g of the NMP solvent and adequately stirred to make the BTA evenly dispersed in the NMP solvent.

(3) The BTA-NMP emulsion was divided into 8 equal parts for adding to the PPMI-NMP solution in a batch for every 15 minutes, and the mixture was adequately stirred to process thermal polymerization of the PPMI double bonds.

(4) When 8 parts of the BTA-NMP emulsion were totally added to the PPMI-NMP solution, the reaction was processed for an additional 4 hours.

(5) The reaction was completed and cooled to room temperature, and the result was a clear yellow liquid, PPMI/BTA(1:1)-NMP-20 wt %-70° C.-6H.

Example 10

STOBA(1:1)-DMF-10 wt %-RT-8 days

STOBA(1:1)-DMF-10 wt %-RT-8 days means that BMI and BTA in the DMF solvent with the solid content of 10 wt % were reacted at room temperature (about 24° C.) for 8 days, wherein the BMI and BTA had a molar ratio of 1:1. The reaction process and conditions are listed as below:

(1) 9 g of 4,4'-Bismaleimido di-phenylmethane (BMI) was charged in a 250 mL three-neck round bottom bottle, added 60 g of the DMF solvent, adequately stirred at room temperature to make the BMI totally dissolved in the DMF solvent.

(2) 3.5 g of BTA powder was added to 40 g of the DMF solvent and adequately stirred at room temperature for 2 hours to make the BTA dissolved in the DMF solvent.

(3) The BTA-DMF solution was divided into 8 equal parts for adding to the BMI-DMF solution in a batch for every 15 minutes, and the mixture was adequately stirred to process polymerization of the BMI double bonds.

(4) When 8 parts of the BTA-DMF solution were totally added to the BMI-DMF solution, the reaction was processed for an additional 8 days.

(5) The reaction was completed and cooled to room temperature, and the result was a clear brown yellow liquid, STOBA(1:1)-DMF-10 wt %-RT-8 days.

Example 11

BMI2/BTA(1:1)-DMF-10 wt %-90° C.-4H

BMI2/BTA(1:1)-DMF-10 wt %-90° C.-4H means that bisphenol A diphenyl ether bismaleimide (BMI2) and BTA in the DMF solvent with the solid content of 10 wt % were reacted at 90° C. for 4 hours, wherein the BMI2 and BTA had a molar ratio of 1:1. The reaction process and conditions are listed as below:

(1) 9 g of bisphenol A diphenyl ether bismaleimide (BMI2) was charged in a 250 mL three-neck round bottom bottle, added 60 g of the DMF solvent, heated to 90° C. and adequately stirred to make the BMI2 totally dissolved in the DMF solvent.

(2) 3.5 g of BTA powder was added to 40 g of the DMF solvent and adequately stirred at room temperature for 2 hours to make the BTA dissolved in the DMF solvent.

(3) The BTA-DMF solution was totally added to the 90° C. BMI2-DMF solution, and the mixture was adequately stirred to process thermal polymerization of the BMI double bonds.

(4) The reaction was processed for an additional 4 hours.

(5) The reaction was completed and cooled to room temperature, and the result was a clear brown yellow liquid, BMI2/BTA(1:1)-DMF-10 wt %-90° C.-4H. Compared to the GPC diagram of the BMI-DMF solution (FIG. 8) and the STOBA product of Example 11, the Rf value of the STOBA product in Example 11 was 26.7 minutes without any BMI of BTA signals. As such, the BMI and the BTA were totally reacted. In addition, the STOBA product of Example 11 is a single peak, it means the STOBA product purity is high.

Example 12

BMI/PMI/BTA(9:1:10)-DMF-10 wt %-90° C.-4H

BMI/PMI/BTA(9:1:10)-DMF-10 wt %-90° C.-4H means that BMI, PMI, and BTA in the DMF solvent with the solid content of 10 wt % were reacted at 90° C. for 4 hours, wherein the BMI, PMI, and BTA had a molar ratio of 9:1:10. The reaction process and conditions are listed as below:

(1) 8.8 g of 4,4'-Bismaleimido di-phenylmethane (BMI) and 0.47 g of N-phenyl-maleimide (PMI) was charged in a 250 mL three-neck round bottom bottle, added 60 g DMF solvent, heated to 90° C., and adequately stirred to make the BMI and PMI totally dissolved in the DMF solvent.

(2) 3.5 g of BTA powder was added to 40 g of the DMF solvent and adequately stirred at room temperature for 2 hours to make the BTA dissolved in the DMF solvent.

(3) The BTA-DMF solution was totally added to the 90° C. BMI/PMI-DMF solution, and the mixture was adequately stirred to process thermal polymerization of the BMI and PMI double bonds.

(4) The reaction was processed for an additional 4 hours.

(5) The reaction was completed and cooled to room temperature, and the result was a clear brown yellow liquid, BMI/PMI/BTA(9:1:10)-DMF-10 wt %-90° C.-4H.

Example 13

BMI/PPMI/BTA(9:1:10)-DMF-10 wt %-90° C.-4H

BMI/PPMI/BTA(9:1:10)-DMF-10 wt %-90° C.-4H means that BMI, PPMI, and BTA in the DMF solvent with the solid content of 10 wt % were reacted at 90° C. for 4 hours, wherein the BMI, PMI, and BTA had a molar ratio of 9:1:10. The reaction process and conditions are listed as below:

(1) 8.8 g of 4,4'-Bismaleimido di-phenylmethane (BMI) and 0.5 g of polyphenylmethane maleimide (PPMI) was charged in a 250 mL three-neck round bottom bottle, added 60 g of the DMF solvent, heated to 90° C., and adequately stirred to make the BMI and PPMI totally dissolved in the DMF solvent.

(2) 3.5 g of BTA powder was added to 40 g of the DMF solvent and adequately stirred at room temperature for 2 hours to make the BTA dissolved in the DMF solvent.

(3) The BTA-DMF solution was totally added to the 90° C. BMI/PPMI-DMF solution, and the mixture was adequately stirred to process thermal polymerization of the BMI and PPMI double bonds.

(4) The reaction was processed for an additional 4 hours.

(5) The reaction was completed and cooled to room temperature, and the result was a clear brown yellow liquid, BMI/PPMI/BTA(9:1:10)-DMF-10 wt %-90° C.-4H.

The Comparative Examples and Examples results were analyzed by GPC with columns KD-G, KD-801, KD-801, KD-802, and KD-802.5 and flow rate of 0.8 mL/min. The major peaks of GPC diagrams were tabulated in Table 1. As shown in Table 1, different BMI/BTA molar ratios, solvents, reaction temperatures and periods can be applied to obtain hyper-branched polymer of similar structure and size. The major product signal is 26.4 to 26.7 minutes, which means that the polymerization will self-terminate. If the reaction is continually processed, the resulting solution would gel. As such, the major product signal is 19 to 23 minutes, as shown in Example 11. The Examples tend to form gel (still not gelled) having a major product signal of 19 to 23 minutes, however, the gelled product cannot be dissolved in DMF to be analyzed by GPC. While the reaction period is longer, the signal peak of the Examples tending to gel in 19 to 23 minutes will be stronger. If the reaction period is long enough and the signal peak of 19 to 23 minutes is strong enough, the product cannot be analyzed due to gel.

TABLE 1

| | peak signals | $1^{st}$ | $2^{nd}$ | $3^{rd}$ | $4^{th}$ | $5^{th}$ | $6^{th}$ | $7^{th}$ |
|---|---|---|---|---|---|---|---|---|
| Reactant | BMI | 40.30 | | | | | | |
| | PMI | 47.46 | | | | | | |
| | BMI2 | 39.43 | | | | | | |
| | PPMI | 34.52 | 35.28 | 36.27 | 40.18* | | | |
| | BTA | 36.76* | 39.84* | | | | | |
| Solvent | DMF | 43.92* | 58.96 | 53.35 | 62.30 | | | |
| | GBL | 49.76 | | | | | | |
| | PC | 46.79 | | | | | | |
| | NMP | 53.33 | | | | | | |
| Comparative 1 | BMI-GBL-20 wt %-90° C.-6H | 40.31* | 43.917* | 49.76* | 58.96 | 62.64 | | |
| Comparative 2 | BMI-NMP-20 wt %-40° C.-6H | 40.30* | 43.62* | 53.33* | 58.62 | 61.91 | | |
| Comparative 3 | BMI-NMP-20 wt %-70° C.-6H | 40.30* | 43.66* | 53.34* | 58.61 | 61.90 | | |
| Comparative 4 | BTA-GBL-1 wt %-40° C.-6H | The BTA cannot be totally dissolved and precipitated. | | | | | | |
| Comparative 5 | BMI-GBL-20 wt %-90° C.-6H | 37.98* | 38.82 | 40.12* | 43.66* | 53.34* | 58.64 | 61.90 |
| Comparative 6 | BMI-GBL-20 wt %-90° C.-6H | 37.91* | 38.30 | 39.72* | 43.94* | 52.34 | 58.97 | 62.28 |
| Example 1 | STOBA(1:1)-GBL-20 wt %-90° C.-6H | 27.87 | 34.90* | 40.53* | 44.03* | 49.96* | 59.09 | 62.40 |
| Example 2 | STOBA(1:1)-NMP-20 wt %-70° C.-6H | 26.41* | 28.18 | 30.19 | 43.66* | 53.34* | 58.62 | 61.92 |
| Example 3 | STOBA(1:1)-DMF-20 wt %-40° C.-20H | 26.52* | 28.23 | 30.07 | 31.75 | 43.86* | 58.87 | 62.18 |
| Example 4 | STOBA(1:1)-NMP/GBL(1:1)-20 wt %-70° C.-6H | 26.45* | 28.18 | 34.11 | 43.64* | 49.91* | 53.33* | 58.62 |
| Example 5 | STOBA(1:1)-DMF/GBL(1:1)-10 wt %-85° C.-6H | 26.61 | 28.72 | 32.68 | 44.00* | 49.96* | 59.08 | 62.41 |
| Example 6 | STOBA(1:1)-DMF-10 wt %-90° C.-6H | 26.68* | 27.90 | 29.91 | 43.79* | 52.39 | 58.78 | 62.09 |
| Example 7 | STOBA(2:1)-NMP/GBL(1:1)-20 wt %-70° C.-6H | 26.42* | 28.22 | 34.03 | 43.65* | 49.89* | 53.34* | 58.60 |
| Example 8 | PMI/BTA(1:1)-NMP/GBL(1:1)-20 wt %-70° C.-6H | 31.68* | 36.06 | 37.28 | 44.1* | 47.08* | 49.88* | 53.55* |

TABLE 1-continued

| | peak signals | $1^{st}$ | $2^{nd}$ | $3^{rd}$ | $4^{th}$ | $5^{th}$ | $6^{th}$ | $7^{th}$ |
|---|---|---|---|---|---|---|---|---|
| Example 9 | PPMI/BTA(1:1)-NMP-20 wt %-70° C.-6H | 22.35* | 35.12 | 36.47 | 38.31* | 43.32* | 58.85 | 62.13 |
| Example 10 | STOBA(1:1)-DMF-10 wt %-RT-8 days | 26.66* | 29.09 | 30.76 | 32.76 | 43.94* | 58.99 | 62.30 |
| Example 11 | BMI2/BTA(1:1)-DMF-10 wt %-90° C.-4H | 20.00 | 26.71* | 28.05 | 43.88* | 52.33 | 58.92 | 62.21 |
| Example 12 | BMI/PMI/BTA(9:1:10)-DMF-10 wt %-90° C.-6H | 26.7* | 29.52 | 31.26 | 43.68* | 52.34 | 58.88 | 62.24 |
| Example 13 | BMI/PPMI/BTA(9:1:10)-DMF-10 wt %-90° C.-6H | 26.68* | 29.78 | 38.33 | 43.66* | 52.33 | 58.62 | 62.26 |

Note:
*means major peak, and
"Bold-type" means solvent peak.

Figure 3:
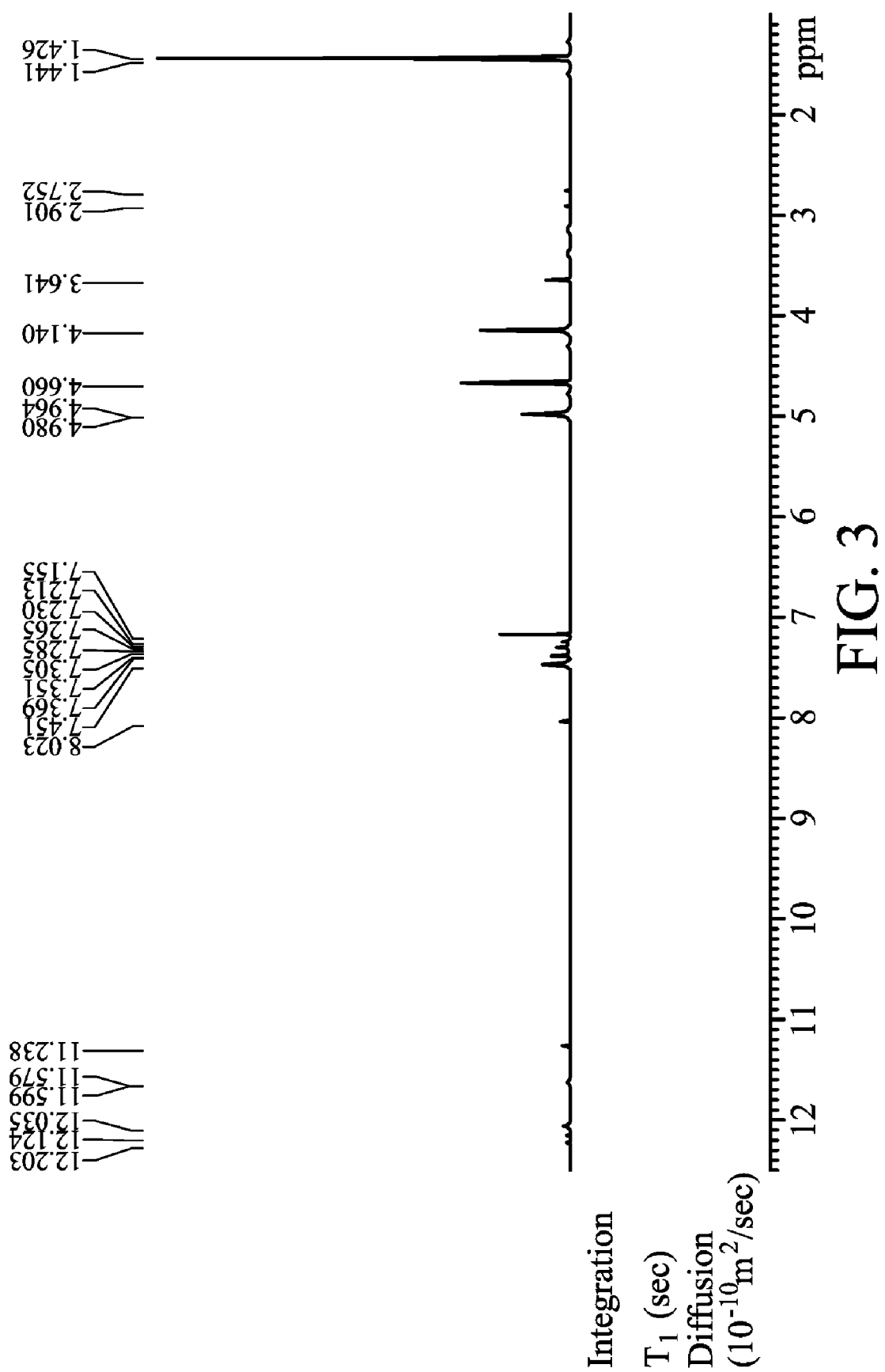
FIG. 3 is the $^1$H NMR spectrum of STOABA (1:1) in one embodiment of the invention.
Figure 4:
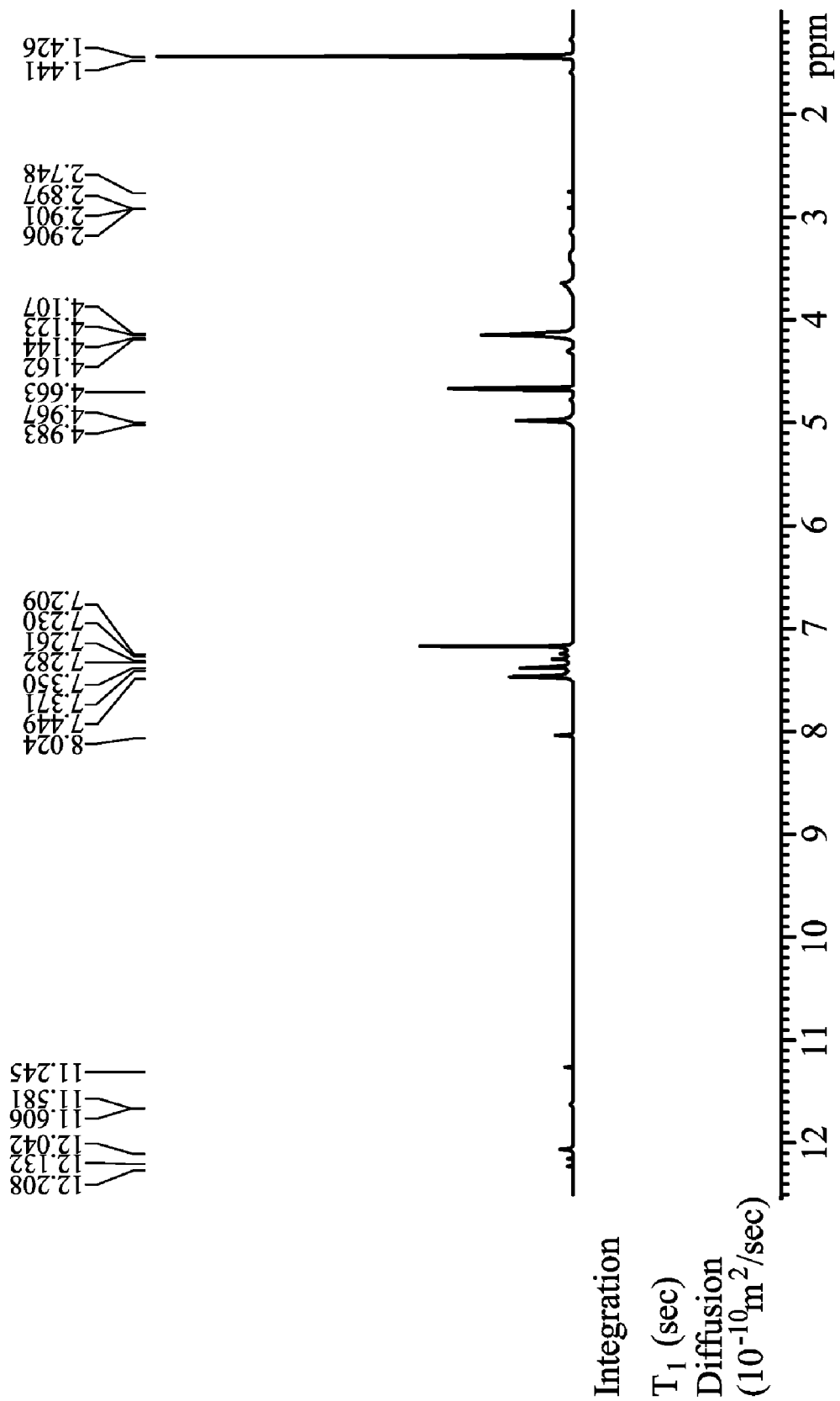
FIG. 4 is the $^1$H NMR spectrum of STOABA (2:1) in one embodiment of the invention.

The STOBA (1:1) products of Examples 1-6 and STOBA (2:1) product in Example 7 were dissolved in DMSO-d$^6$ to obtain $^1$H-NMR spectra thereof, respectively. Referring to $^1$H-NMR spectra of Examples 1-6, whether the solvent was GBL, PC, NMP, or DMF, the chemical shifts corresponding to each character hydrogen were similar. On the other hand, when the molar ratio of BMI and BTA was 1:1 (FIG. 3) or 2:1 (FIG. 4), the chemical shifts corresponding to each character hydrogen were similar. In FIGS. 3 and 4, the chemical shifts include δ11.2-12.4 (—NH group of the BTA in STOBA), δ7.155 (hydrogen on double bond of BMI), and δ7.2-7.5 (hydrogen on benzene of BMI). Compared to the $^1$H-NMR spectra of BTA (FIG. 1) and BMI (FIG. 2), the STOBA products (FIGS. 3 and 4) of Examples 1-7 remained some BMI and BTA.

Figure 5:
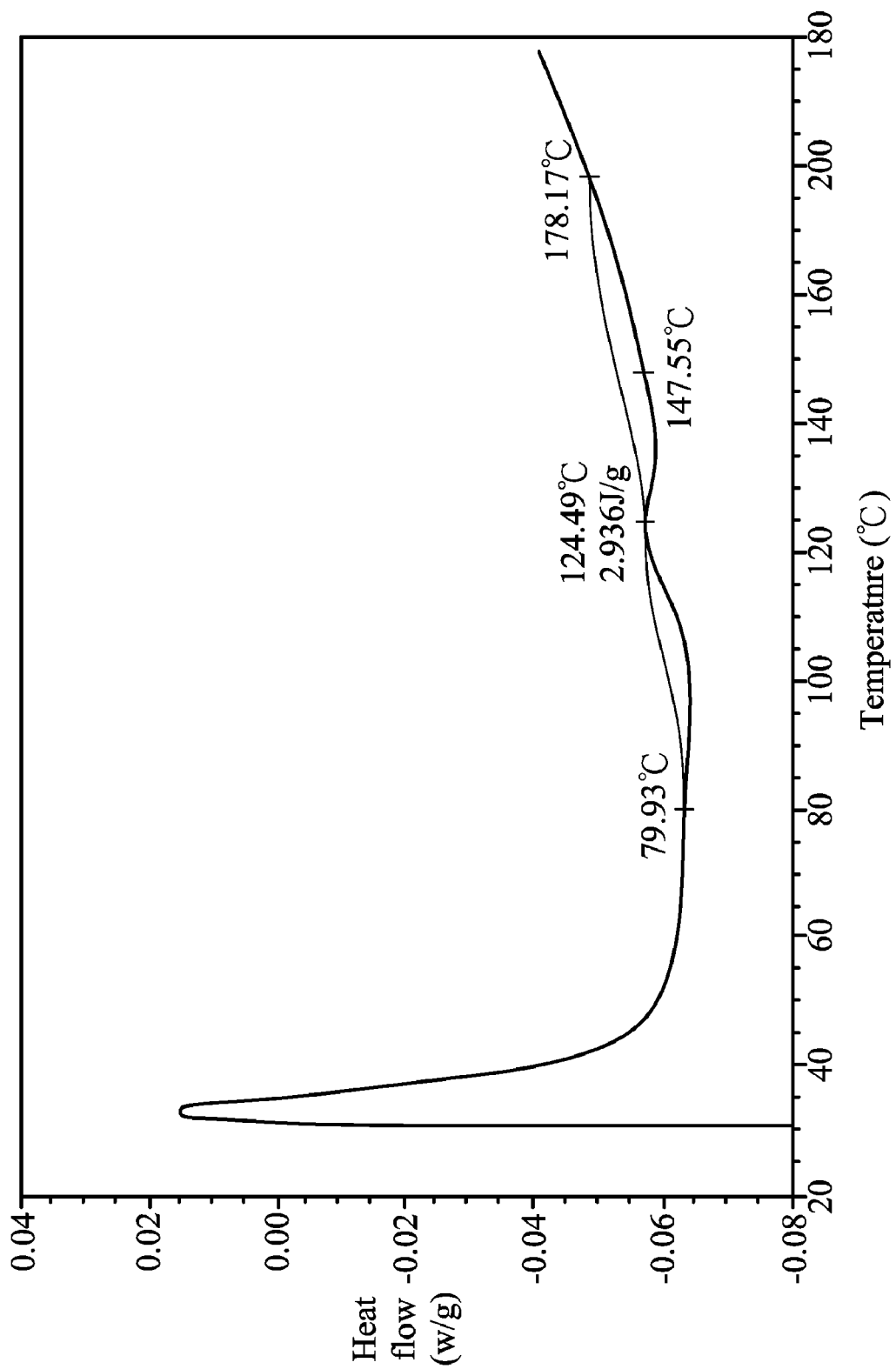
FIG. 5 is the DSC diagram in Example 1 of the invention.
Figure 6:
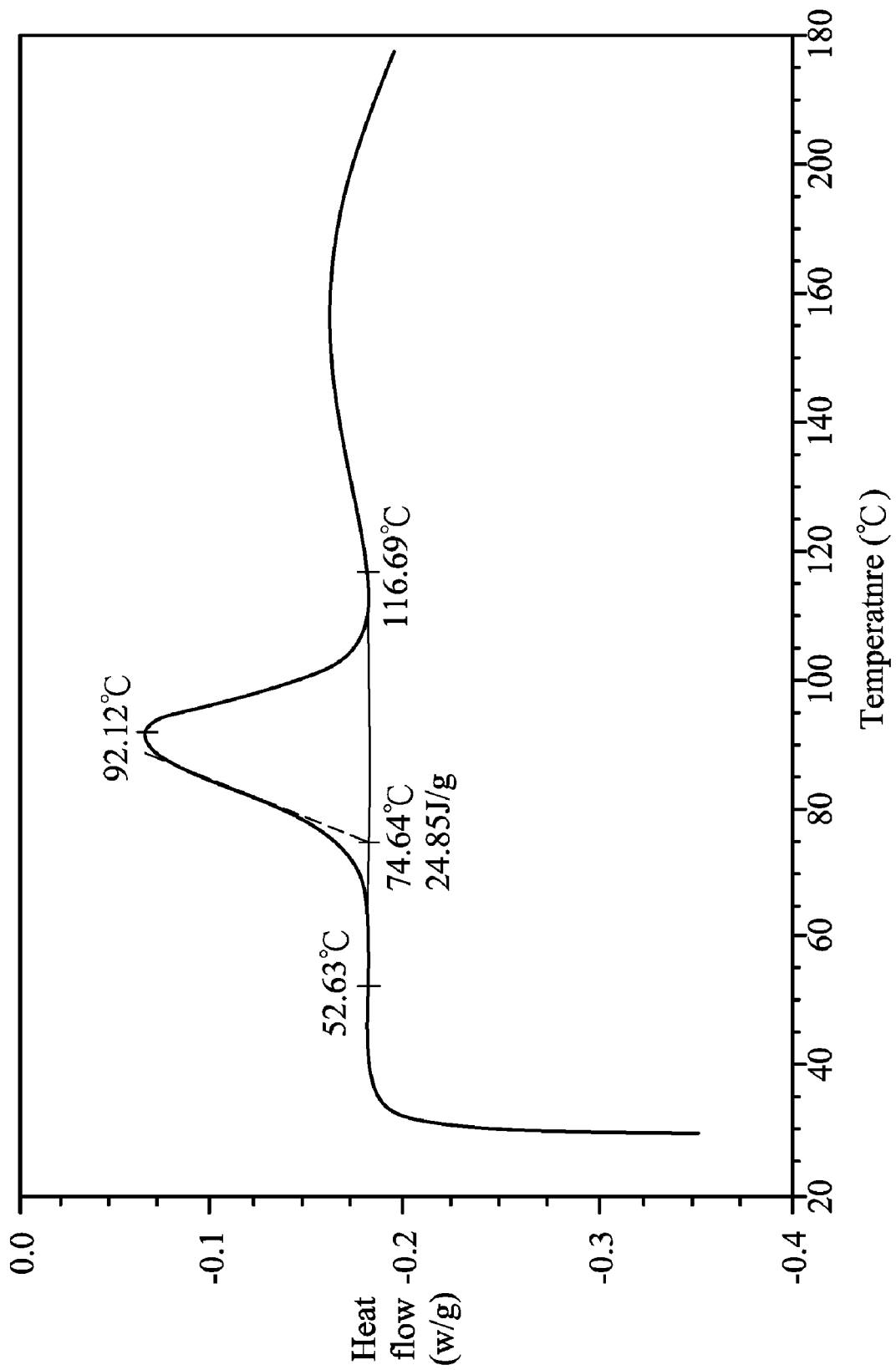
FIG. 6 is the DSC diagram in Example 4 of the invention
Figure 7:
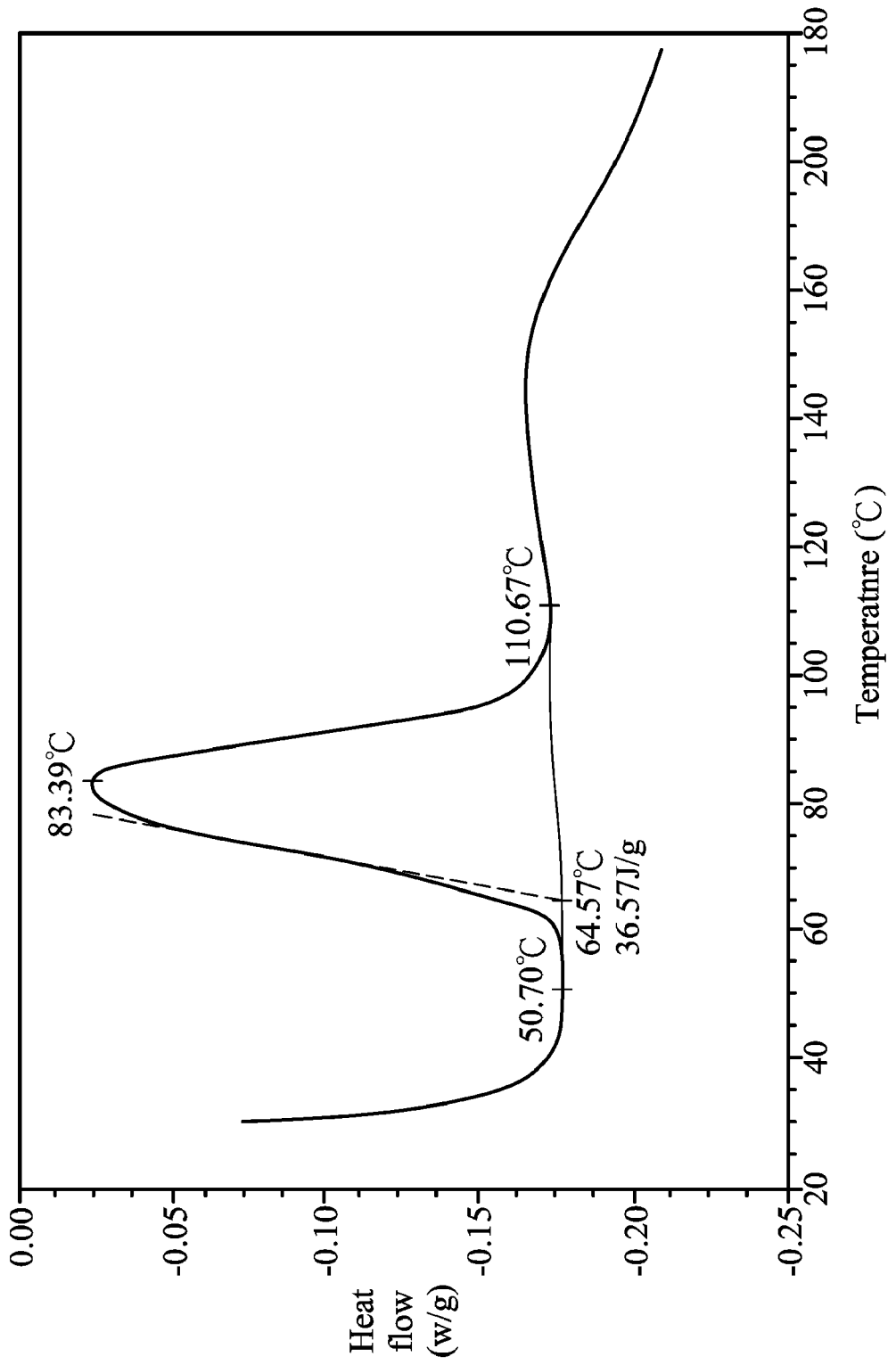
FIG. 7 is the DSC diagram in Example 2 of the invention

Examples 1, 2, and 4 were further analyzed by differential scanning calorimetry (DSC) to determine the reaction temperatures thereof as shown in FIGS. 5-7. Referring to FIGS. 5-7, when the solvent includes Brönsted base such as NMP, the reaction temperature was efficiently reduced. As shown in FIG. 5, the solvent was GBL in Example 1 and the reaction exothermic peak was about 124° C. As shown in FIG. 6, the solvent included equal weight of GBL and NMP in Example 4 and the reaction exothermic peak was reduced to about 92° C. As shown in FIG. 7, the solvent was solely NMP in Example 2 and the reaction exothermic peak was reduced to only about 83° C.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for forming a hyper-branched polymer, comprising:
adding a bismaleimide and a barbituric acid into a Brönsted base solution and reacting the mixture at 20 to 100° C. to form a hyper-branched polymer.

2. The method as claimed in claim 1, wherein the Brönsted base solution comprises N-methyl-2-pyrrolidone, dimethylformamide, dimethylacetamide, pyrrolidone, or N-dodecylpyrrolidone.

3. The method as claimed in claim 1, wherein the bismaleimide is represented as below:

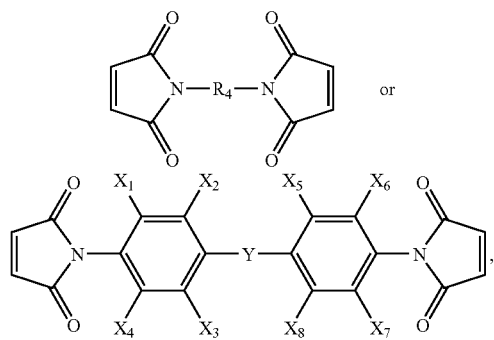

wherein $R_4$ is selected from —R—, —R—NH$_2$—R—, —C(O)—, —R—C(O)—R—, —R—C(O)—, —O—, —O—O—, —S—, —S—S—, —S(O)—, —R—S(O)—R—, —SO$_2$—, —(C$_6$H$_4$)—, —R—(C$_6$H$_4$)—R—, —R—(C$_6$H$_4$)—O—, —(C$_6$H$_4$)—(C$_6$H$_4$)—, —R—(C$_6$H$_4$)—(C$_6$H$_4$)—R—, or —R—(C$_6$H$_4$)—(C$_6$H$_4$)—O—, and
Y is selected from —R—, —C(O)—, —O—, —O—O—, —S—, —S—S—, —S(O)—, or —SO$_2$—; each X$_1$, X$_2$, X$_3$, X$_4$, X$_5$, X$_6$, X$_7$, and X$_8$ is independently selected from halogen, hydrogen, C$_{1-8}$ alkyl, C$_{1-8}$ cycloalkyl, or C$_{1-8}$ silylalkyl; and
R is C$_{1-8}$ alkyl, (C$_6$H$_4$) is phenyl, and (C$_6$H$_4$)—(C$_6$H$_4$) is biphenyl.

4. The method as claimed in claim 1, wherein the bismaleimide comprises
N,N'-bismaleimide-4,4'-diphenylmethane,
1,1'-(methylenedi-4,1-phenylene)bismaleimide,
N,N'-(1,1'-biphenyl-4,4'-diyl)bismaleimide,
N,N'-(4-methyl-1,3-phenylene)bismaleimide,
1,1'-(3,3'dimethyl-1,1'-biphenyl-4,4'-diyl)bismaleimide,
N,N'-ethylenedimaleimide,
N,N'-(1,2-phenylene)dimaleimide,
N,N'-(1,3-phenylene)dimaleimide,
N,N'-thiodimaleimid,
N,N'-ketonedimaleimid,
bis-maleinimidomethyl-ether,
1,2-bis-(maleimido)-1,2-ethandiol,
N,N'-4,4'-diphenylether-bis-maleimid, or
4,4'-bis(maleimido)-diphenylsulfone.

5. The method as claimed in claim 1, wherein the bismaleimide and the barbituric acid have a molar ratio of 40:1 to 0.4:1.

6. The method as claimed in claim 1, further adding a maleimide, a multi-maleimide, or combinations thereof into the Brönsted base solution.

7. The method as claimed in claim 6, wherein the maleimide comprises N-phenylmaleimide or N-cyclohexylmaleimide.

8. The method as claimed in claim 6, wherein the multi-maleimide comprises tris(4-phenymaleimide) amine or polyphenylmethane maleimide.

9. The method as claimed in claim 6, wherein the bismaleimide and (the multi-maleimide and/or the maleimide) have a molar ratio of 99:1 to 1:1.

10. The method as claimed in claim 1, wherein the hyper-branched polymer is applied in electronic packaging, displays, solar cells, detectors, photoelectric materials, electrolyte additives, liquid/gel/solid polymer electrolytes, separator films, ion/proton exchange membranes, electrode additive, catalysts, functional composites, coatings, or bio-materials.

11. A method for forming a hyper-branched polymer, comprising:
   adding a bismaleimide and a barbituric acid into a Brönsted base solution and reacting the mixture at 20 to 100° C. to form a hyper-branched polymer;
   wherein the Brönsted base solution comprises N-methyl-2-pyrrolidone, dimethylformamide, dimethylacetamide, pyrrolidone, or N-dodecylpyrrolidone;
   wherein the bismaleimide comprises
      N,N'-bismaleimide-4,4'-diphenylmethane,
      1,1'-(methylenedi-4,1-phenylene)bismaleimide,
      N,N'-(1,1'-biphenyl-4,4'-diyl)bismaleimide,
      N,N'-(4-methyl-1,3-phenylene)bismaleimide,
      1,1'-(3,3'dimethyl-1,1'-biphenyl-4,4'-diyl)bismaleimide,
      N,N'-ethylenedimaleimide,
      N,N'-(1,2-phenylene)dimaleimide,
      N,N'-(1,3-phenylene)dimaleimide,
      N,N'-ketonedimaleimid,
      N,N'-methylene-bis-maleinimid,
      bis-maleinimidomethyl-ether,
      1,2-bis-(maleimido)-1,2-ethandiol,
      N,N'-4,4'-diphenylether-bis-maleimid, or
      4,4'-bis(maleimido)-diphenylsulfone; and
   wherein the bismaleimide and the barbituric acid have a molar ratio of 40:1 to 0, 4:1.

* * * * *